United States Patent [19]
Ross et al.

[11] 3,951,198
[45] Apr. 20, 1976

[54] APPARATUS AND METHOD FOR RECOVERING PURE WATER FROM NATURAL SOURCES AND INDUSTRIAL POLLUTED WASTE SOURCES

[75] Inventors: Sigmund Lance Ross, Brooklyn, N.Y.; Oscar Shuffman, deceased, late of Scarsdale, N.Y., by Rose Shuffman, executrix

[73] Assignee: Rose Shuffman, executrix, Scarsdale, N.Y.

[22] Filed: Aug. 15, 1972

[21] Appl. No.: 280,933

[52] U.S. Cl. ............................ 165/65; 55/222; 122/487; 159/3; 159/DIG. 2; 165/111; 165/114; 202/185 R; 202/197; 159/2 R
[51] Int. Cl.² .............. F25B 29/00; F25B 43/00; B01D 3/00
[58] Field of Search ............... 165/61, 111, 114; 122/487; 159/DIG. 2, 2, 3; 202/185 R, 197; 55/222 X, 228

[56] References Cited
UNITED STATES PATENTS

| | | | |
|---|---|---|---|
| 1,516,512 | 11/1924 | Stutzke | 159/2 R |
| 1,845,542 | 2/1932 | Smith | 165/114 |
| 1,941,650 | 1/1934 | Baumann | 165/114 |
| 2,699,822 | 1/1955 | Jehlicka | 159/3 R |
| 2,853,127 | 9/1958 | Sessen | 159/2 R |
| 3,273,316 | 9/1966 | Ross | 62/14 X |
| 3,369,977 | 2/1968 | Bechard | 159/DIG. 2 |
| 3,438,869 | 4/1969 | Saavedra | 159/DIG. 2 |
| 3,480,515 | 11/1969 | Goeldner | 202/197 X |
| 3,577,322 | 5/1971 | Nesbitt et al. | 159/46 X |
| 3,676,485 | 7/1972 | Lewis et al. | 202/197 X |
| 3,686,077 | 8/1972 | Koning | 202/197 X |
| 3,727,588 | 4/1973 | Ross | 122/487 |

*Primary Examiner*—Albert W. Davis, Jr.
*Assistant Examiner*—Sheldon Richter
*Attorney, Agent, or Firm*—Richard K. Parsell

[57] ABSTRACT

Apparatus and method for purifying industrial waste gases, and during the process of purifying the waste gases, a solution of polluted water is obtained which is subsequently passed through additional associated apparatus in order to recover comparatively pure water. The apparatus includes an in-line condenser for reducing the temperature of the industrial waste gases prior to being conducted to a waste gas purifier. The solid particulate matter of the industrial waste gases are collected in suitable disposal containers, while the liquid waste from the gas purifier is conducted to a liquid collection means from which the liquid waste is passed through a thermal energy generator for producing super-heated steam that is subsequently conducted to a condensing box for recovering comparatively pure water.

6 Claims, 5 Drawing Figures

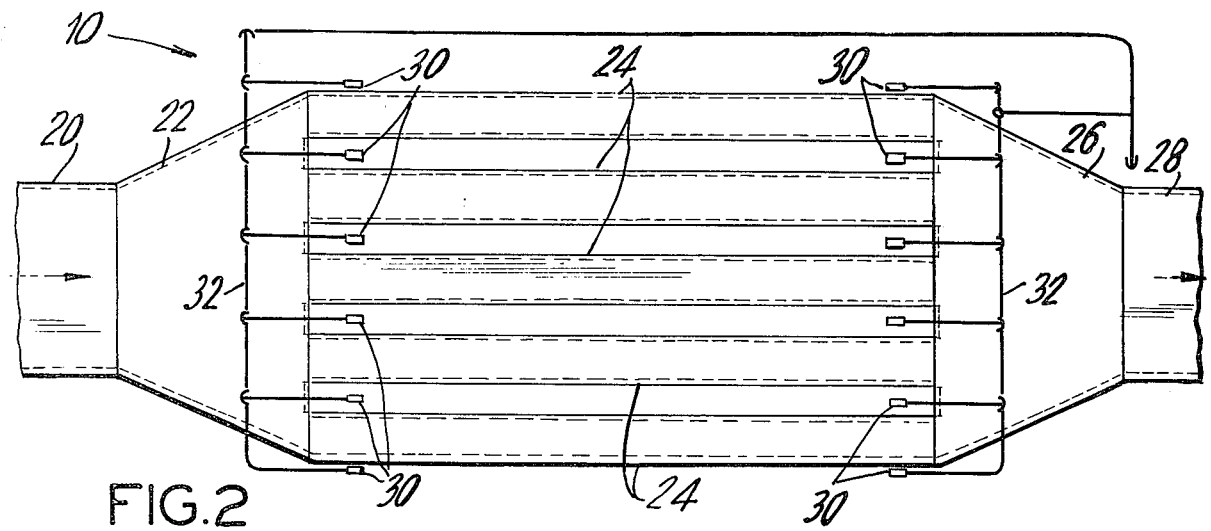
FIG. 2
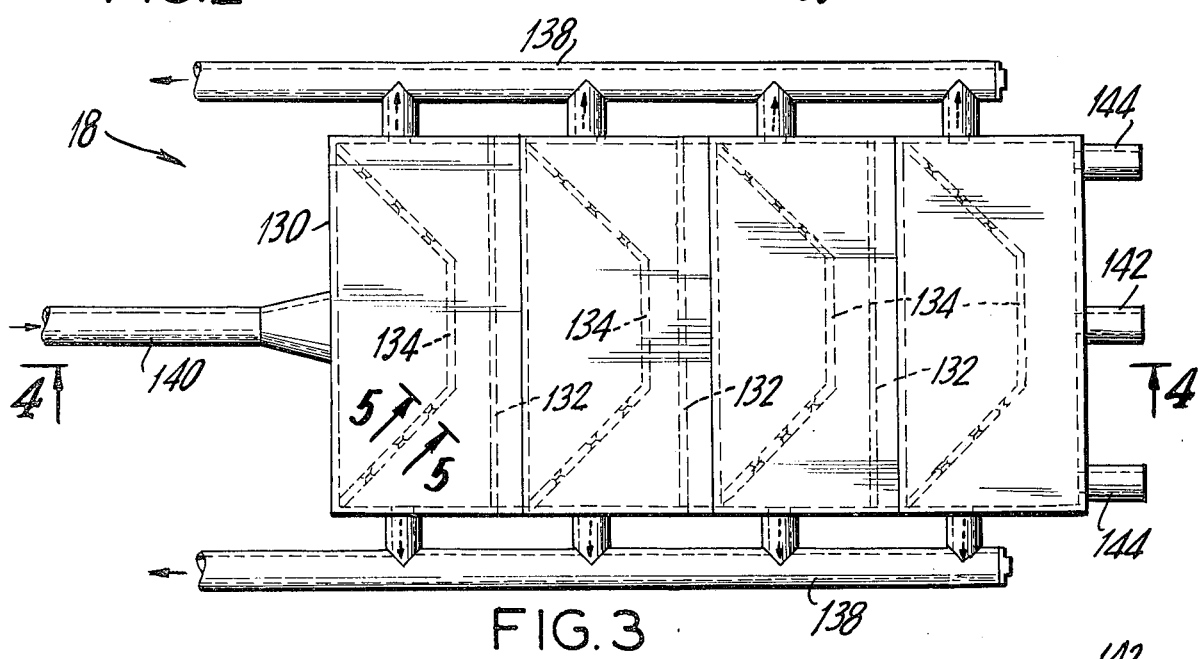
FIG. 3
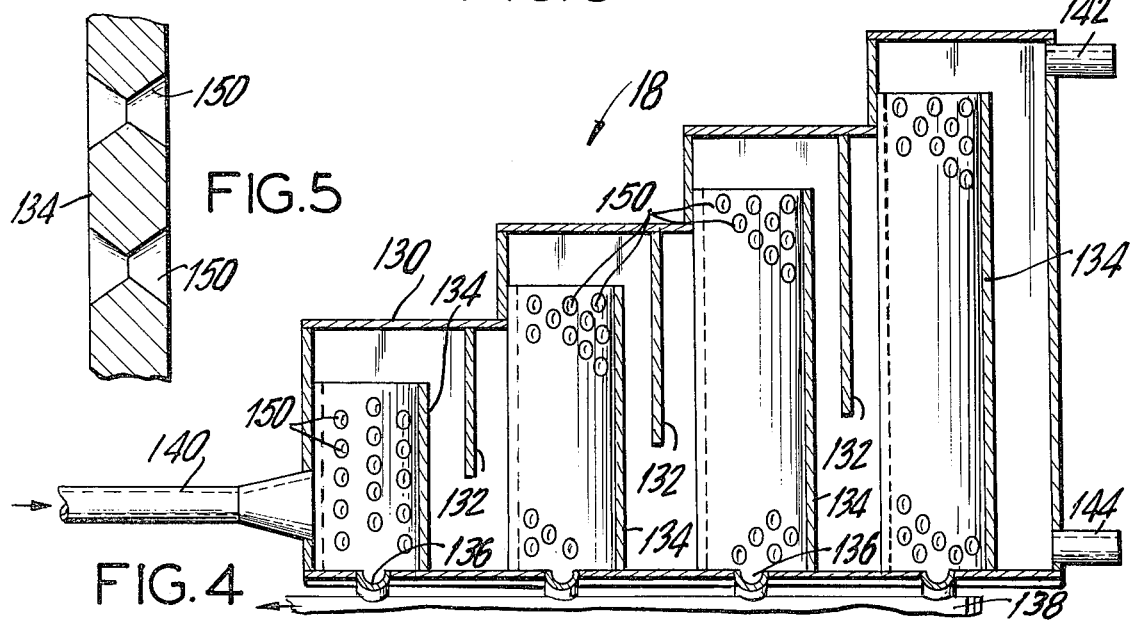
FIG. 5
FIG. 4

APPARATUS AND METHOD FOR RECOVERING PURE WATER FROM NATURAL SOURCES AND INDUSTRIAL POLLUTED WASTE SOURCES

The present invention relates to a method and apparatus for purifying industrial waste gases in order to avoid polluting the atmosphere and adversely affecting the ecology, and to further process the removed substances in order to produce comparatively pure water.

U.S. Pat. No. 3,273,316, entitled INDUSTRIAL WASTE GAS PURIFIER METHOD which issued to Sigmund L. Ross on Sept. 29, 1966 discloses a cryogenic technique for cleaning industrial waste gases. More particularly, this patent discloses the concept of passing waste gases through beds of ice crystals, in order both to clean the gas and to recover entrained chemicals therein. The ice beds in the apparatus are created by spraying liquid nitrogen around the periphery of a falling spray of water, with the temperature of the nitrogen entering the icing chamber (about −320°F.) causing the formation of fine ice crystals. The latter are carried upwards in the waste gas entering the bottom of the chamber, and become packed against the undersurfaces of a series of mesh baffles or trays through which the gas passes. The turbulent gas in the icing chamber is washed by the falling spray, and during its subsequent passage up through the melting ice crystals, it loses most of the entrained chemicals which are thus dissolved or suspended in the wash water, and the wash water is washed out through the bottom of the apparatus, together with any particulate matter that are present in the waste gases.

An improved industrial waste gas purifier is disclosed in application Ser. No. 280,932, filed concurrently with the subject application by Sigmund Lance Ross and Oscar Shuffman, co-inventors of the subject invention, with the improved industrial waste gas purifier being characterized by apparatus for the production of a corrosive acid, such as sulphuric acid, as a liquid waste. More particularly, the improved industrial waste gas purifier operates as a form of natural electrostatic precipitation to effect the ionization of the industrial waste gases that enter it. Should any sulphur dioxide be present, the sulphur dioxide is converted into sulphur trioxide by absorption of oxygen molecules from a descending water spray. Then, as the waste gases rise higher, it encounters an ice bed of appropriate thicknesses. Since ice in forming can have, in the form of inclusions, anywhere from 13.4 to 26.3% plus more oxygen than is found in the atmosphere, contact of the heated waste gases with the ice crystals making up the ice bed releases the molecules of oxygen contained in the inclusions on the surface of the ice. The result is the formation of sulphur trioxide which on continuing upward (entrained in the rising gases) on contact with the ice crystals making up the ice bed, plus whatever ice crystals and supercooled water droplets exist in the chilled atmosphere just under the ice bed, plus the ionization of the gas in its progress up the unit, and in the presence of heavy water vapor condensation, the sulphuric trioxide is converted to liquid sulphuric acid. The liquid sulphuric acid is washed out of the improved waste gas purifier and is conveyed to a settling tank where, because of its greater specific gravity, it settles to the bottom of the tank.

The apparatus and method of the subject invention employs the improved waste gas purifier apparatus as disclosed in application Ser. No. 280,932, and in addition provides a method and apparatus for further processing of the liquid waste to result in the recovery of comparatively pure water.

Briefly, the apparatus of the subject invention includes, in combination, a condenser means disposed in the waste gas exhaust duct of an industrial plant, which in-line condenser functions to cool the waste gases preparatory to admission to a gas cleaning means, including a waste gas purifier of the type disclosed in application Ser. No. 280,932. The industrial waste gas purifier is surrounded by an insulated jacket which is spaced from the purifier so as to define a passageway therebetween. The exhaust duct leading to the purifier includes outlet means to enable solid particles such as fly ash to be removed from the waste gas flow, with the remaining portions of the waste gas passing upwardly to the purifier. The output end of the waste gas purifier is connected to a gas circulating means including duct work and an exhaust fan which operates to pull the gases through the purifier, followed by recirculating the exhaust gases to the annular passageway defined by the insulated jacket and the purifier in the vicinity of the input end of the purifier. The waste gases then flow through the passageway and are allowed to exhaust to the atmosphere in the vicinity of the opposite end of the waste gas purifier. As part of the operation of the waste gas purifier, waste wash liquids are collected at the lower end of the waste gas purifier, which liquids include the entrained chemicals from the exhaust flow that are dissolved or suspended in the wash liquid. The latter is collected and conveyed by suitable piping to a settling tank, from which the waste liquids are pumped to a thermal energy generator of the type disclosed in U.S. patent application Ser. No. 202,215, which was filed on Nov. 26, 1971 by Sigmund Lance Ross and entitled THERMAL ENERGY GENERATION now U.S. Pat. No. 3,727,588. The thermal energy generator operates in a continuous manner to produce super-heated steam from the impure waste liquid pumped from the settling tank. The super-heated steam is then conveyed to a condenser box for the production of comparatively pure water. Hence, utilizing the apparatus of the subject invention, waste exhaust gases from an industrial plant are purified, and at the same time, comparatively pure water is produced.

In the method of the subject invention, the waste gases are first cooled and then passed to a waste gas purifier unit from which the waste gases are circulated between the outer wall of the waste gas purifier and a surrounding insulated duct prior to exhausting to the atmosphere, with the liquid waste from the waste gas purifier being conducted to a liquid collection means and then to a thermal energy generator for the production of super-heated steam that is subsequently condensed to produce comparatively pure water.

Further objects, features and advantages of the invention will be apparent from the following detailed description of the invention taken in conjunction with the accompanying drawings wherein:

FIG. 1 schematically illustrates the apparatus of the subject invention;

FIG. 2 is a plan view of the in-line condenser unit employed in the subject invention;

FIG. 3 is a plan view of a four-tier condenser employed in the subject invention;

FIG. 4 is a sectional view of the four-tier condenser taken along line 4—4 in FIG. 3; and FIG. 5 is a partial sectional view of a nozzle of the condensing baffle taken along line 5—5 in FIG. 3.

Figure 1:
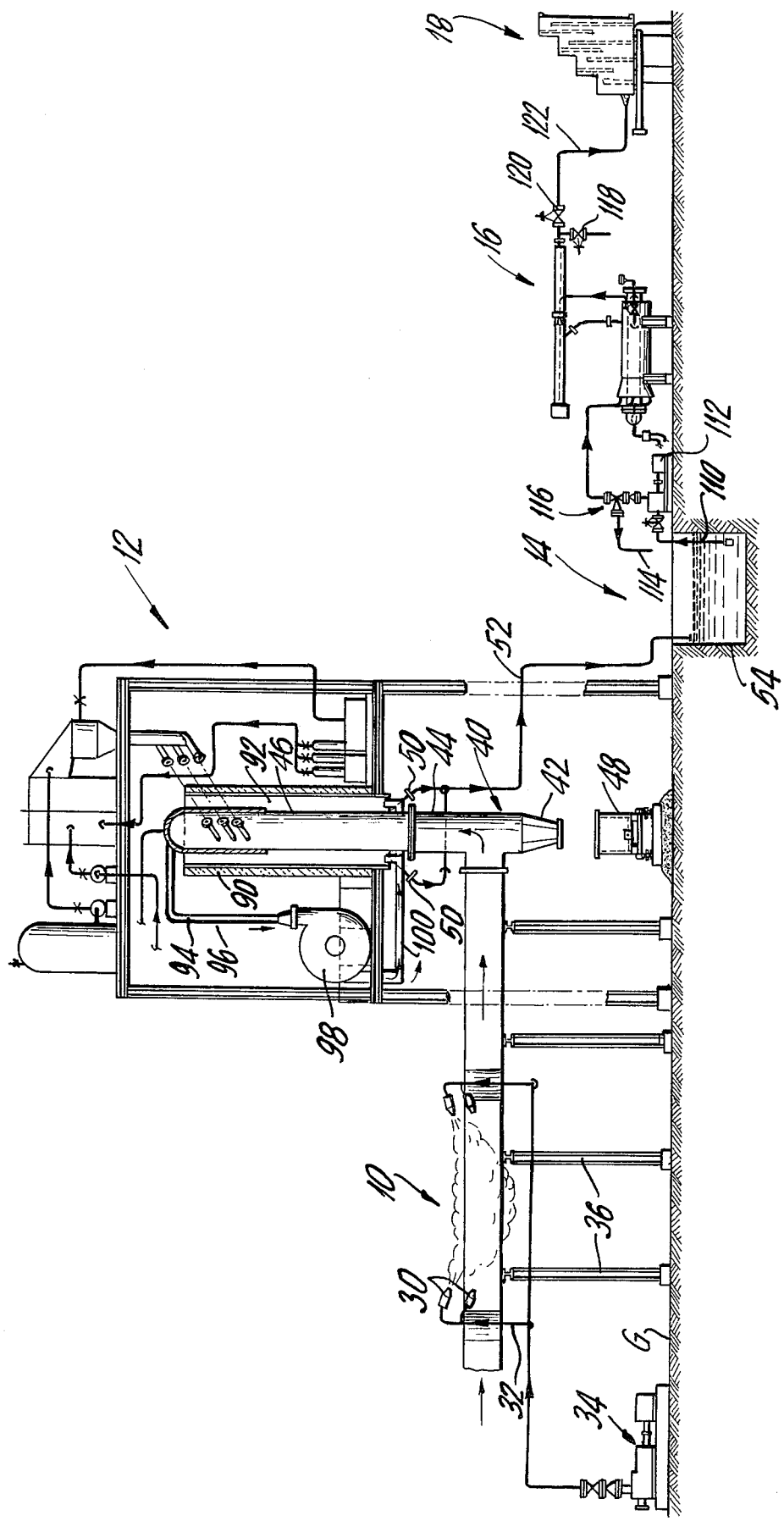

The apparatus of the subject invention is adapted to purify the industrial waste gases from the furnaces of an industrial plant (not shown), and in particular to remove as much as possible of the particulate matter therefrom, and to purify the gaseous waste to remove the noxious gases, and at the same time to recover comparatively pure water which is entrained in the industrial waste gases. As shown in FIG. 1, the apparatus generally comprises an in-line condenser means 10, as gas cleaning means 12, waste liquid collection means 14, a thermal energy generator 16, and a liquid condensing means 18 for recovering the pure water. Referring to FIG. 2, the waste gases from the industrial plant are conducted via a larger rectangular duct 20 through a transition duct 22 to a series of spaced, parallel rectangular ducts 24 which form a portion of the in-line condenser 10. The opposite ends of the rectangular ducts 24 are connected to a second transition duct 26 which connects to a larger rectangular duct 28 that leads to the gas cleaning means 12. Disposed above and along the sides of the spaced ducts 24 are a plurality of nozzles 30 which are connected via suitable piping 32 to a water pump 34. Pump 34 is connected to a source of water, and preferably an impure source of water such as a river bed, having an approximate temperature of 50°F. As the industrial waste gases are conducted through the duct 20 to the in-line condensing means 10, water is sprayed in a fog type spray through the nozzles 30 over and around the spaced parallel rectangular ducts 24 to effect the rapid lowering of the temperature of the industrial waste gases prior to being introduced to the waste gas purifier means. Preferably,, as the waste gases leave the rectangular ducts 24 and into the transition duct 26, the gases are at a temperature of approximately 125°–150°F. As illustrated in FIG. 1, the duct 20, 28 is supported above the ground G by supports 36.

The opposite end of the duct 28 connects to a vertically extending T-shaped duct 40, the lower end of 42 of which is open, while the upper end 44 is connected to a waste gas purifier 46 of the cryogenic type. Disposed beneath the open end 42 of the T-shaped duct 40 is a suitable collecting means in the form of a track mounted hauling car 48 which collects the solid particulate matter in the industrial waste gases that have been cooled by passing through the condensing means 10. The waste gases rise upwardly through the end 44 of the T-shaped duct 40 to the waste gas purifier which is of the type described in application Ser. No. 280,932. The waste gas purifier 46 includes liquid wash out nozzles 50 disposed along the bottom portion therof and connected via piping 52 to the liquid collection means 14, and more particular the settling tank designated by the numeral 54 located in the ground G. As more fully described in application Ser. No. 280,932, the waste gas purifier 46 includes means to permit the formation within the purifier of a natural electrostatic precipitation effect which ionizes the industrial waste gases. Should any sulfur dioxide be present, the sulfur dioxide is converted into sulfur trioxide by absorption of oxygen molecules from a descending water spray within the industrial waste gas purifier. Then, as the waste gases rise higher within the purifier, the waste gases encounter an ice bed of appropriate thickness. Since ice in forming can have, in the form of inclusions, anywhere from 13.4 to 26.3 percent plus more oxygen than is found in the atmosphere, contact of the industrial waste gases with the ice crystals within the purifier releases the molecules of oxygen, and since sulfur trioxide is very hygroscopic, and since gas ionization in the presence of water vapor precipitates condensation, the heavy condensation in addition to the release of oxygen from the ice crystals causes the sulfur trioxide to rapidly convert to sulfuric acid. The latter is collected along the lower end of the industrial waste gases in the vicinity of the washout nozzles 50. As shown in FIG. 1, the entire waste gas purifier 46 is disposed within and spaced from a cyclindrical insulated jacket 90 so as to define as passageway 92 therebetween. Furthermore, the upper portion of the outlet or the upper portion of the waste gas purifier 46 is connected to a ducting 94 that is also insulated as at 96 and extends to an exhaust fan 98, the outlet of which is connected via a ducting 100 to the lower portion of the passageway 92 in the vicinity of the inlet to the gas purifier means. In operation, the waste gases conducted out of the purifying unit by operation of the fan 100 primarily consist of oxygen and a large amount of nitrogen. The exhaust gases are conducted through the ducting 94,100 and up between the annular space 92 defined by the insulated jacket 90 and the purifier 46. The gases conducted between the annular space 92 form a cold front all around the periphery of the outer wall of the purifier, thereby increasing the rate of heat exchange within the purifier, (that is, the hot gases on the inside to the cold gases on the outside). These gases are forced up through the passageway 92 and allowed to exhaust to the atmosphere.

As previously mentioned, as the industrial waste gases come in through the entrance of the waste gas purifier, the waste gases are cooled such that they lose their buoyancy, and much of the particulate matter which is suspended or entrained in the waste gas stream drops out and falls into the fly ash end 42 of the duct 40, and is eventually dumped into the hauling car 48.

The liquid waste from the industrial waste gas purifier are conducted via piping 52 to the settling tank 14. The liquids collected in the settling tank may consist of water, sulfuric acid, and other acids, depending upon the composition of the industrial waste gases that pass through the purifier 12. The apparatus and method of the subject invention also provides means for treating such waste liquids in order to recover comparatively pure water. Furthermore, the invention is also applicable to the treatment of natural water, e.g. from a river, ocean, or other natural body of water, either polluted or not polluted, in order to recover comparatively pure water. The liquids from the waste settling tank 14 or from a natural bed of water are conveyed via suitable piping 110 and a pumping means 112, along with an additional supply of water via piping 114, through a valving arrangement 116 to the thermal energy generator 16, of the type disclosed in U.S. application Ser. No. 202,215, filed on Nov. 26, 1971 by Sigmund Lance Ross and entitled THERMAL ENERGY GENERATION (now U.S. Pat. No. 3,727,588). The impure water which is obtained from the settling tank is continually sprayed into the elongated conduit of the thermal energy generator, the latter having an inlet for the water adjacent one end and an open outlet remote from the inlet, while maintaining the inner surface of the conduit at a temperature such that the water not only is flashed into steam but also is substantially immediately converted into super-heated steam under the confinement imposed by the inner surface of the conduit, with the committant pressure build-up which propels the steam and super-heated steam toward the outlet with a velocity such that the conduit is self-scavaging. Hence, the inner surfaces of the thermal energy generator remain clean, notwithstanding indefinitely long periods of continuous operation, and notwithstanding the impure nature of the waste liquids which are passed through the thermal energy generator.

From the outlet of the thermal energy generator the super-heated steam is either passed through a valve 118 to a utilization means capable of being driven by the super-heated steam. Alternatively the super-heated steam may be passed through a valve 120 to a conduit 122 leading to the four-tier condenser 18 for the production of comparatively pure water.

Reference is made to FIGS. 3 through 5 which show detailed views of the four-tier condenser. Fundamentally, the arrangement of the four-tier condenser is employed for producing comparatively pure water in that the super-heated steam and the impurities from the water entrained therein, are conveyed by the conduit 122 to the multi-step condenser box 18, and the baffle system within the condenser box permit the super-heated steam to pass through converging-diverging nozzles drilled into the sections of the baffles which causes steam to lose heat and concurrently loose bouyancy. The particulate matter entrained in the steam is precipitated out, and that portion of the steam remaining is carried upward through the various stages of the condensing box until finally the steam remaining is comparatively pure, and passes through a final outlet where it is condensed to form comparatively pure water. As shown in FIGS. 3 and 4, the four-tiered condensing box includes an enclosure 130 of stepped construction, having vertically extending baffles 132 depending from the upper portion of the enclosure while a corresponding number of V-shaped baffles 134 are secured to the lower floor of the condensing box. In addition, extending transverse to the longitudinal axis of the condensing box are open collection tubes 136 which are connected to a common manifold piping 138,138 disposed on opposite sides of the condensing box which leads to a waste collection means (not shown). The inlet pipe to the condensing box for admitting the super-heated steam from the thermal energy generator is designated by numeral 140, and the outlet for the comparatively pure super-heated steam is disposed at the upper end of the enclosure adjacent the last tier, and is designated by numeral 142. Additional collection tubes for the impure water are designated by numerals 144,144. Each of the baffles 134 is provided with a plurality of openings, in the form of converging-diverging nozzles designated by numerals 150 in FIG. 5. The provision of the converging-diverging nozzles 150 greatly aids in the rapid condensing of the super-heated steam thereby causing it to lose heat, and results in the distilling out of the impurities from the remaining steam. The combination of the vertical depending baffles 132 and the baffles 134 including the converging-diverging nozzles 115 provides an arrangement for ensuring that as the super-heated steam passes through the four-tier condensing means, the particulate matter is precipitated out and the steam which eventually reaches outlet 142 may be readily condensed to provide comparatively pure water.

The method and apparatus of this invention are primarily intended for continuous operation for a relatively long period of time. During the operation, the method of the invention provides for the steps of first cooling of the industrial waste gases by the in-line condenser means 10, after which the cooled waste gases are passed through the waste gas purifier unit 12, with the output of the waste gas purifier being circulated through the passageway 92 prior to exhausting to the atmosphere. At the same time, the liquid waste from the purifier is conveyed to the settling tank 14, from which the impure liquid is provided to the thermal energy generator 16 where the waste liquid is flashed into super-heated steam, and then conveyed to the 4-tier condensing box 18 for the production of comparatively pure water.

While this invention has been described in connection with certain specific embodiments thereof, it is understood that this has been done merely for purposes of illustration and that the invention may be variously applied and utilized in accordance with its rationale as hereinabove set forth.

What is claimed is:

1. Apparatus for purifying industrial waste gases and recovering comparatively pure water comprising, in combination:

in-line condenser means for cooling the waste gases;
   gas cleaning means connected to said in-line condenser means and including:
   1. a waste gas purifier of the cryogenic type, which purifier has an input connected to the output of the in-line condenser means, and an output, said purifier further including a liquid exhaust means;
   2. an insulated jacket spaced from and surrounding said waste gas purifier so as to define a passageway therebetween;
   3. waste gas circulating means connected to the output of the waste gas purifier and to the passageway in the vicinity of the input end of the purifier, with the opposite end of the passageway exhausting to the atmosphere;
   liquid collection means connected to the liquid exhaust means of the waste gas purifier for collecting the impure liquids produced during the purification of the waste gases;
   thermal energy generator means connected to said liquid collection means and operative to produce superheated steam; and
   a condensing box connected to the output of the thermal energy generator to produce comparatively pure water.

2. Apparatus for purifying industrial gases and recovering comparatively pure water as in claim 1 wherein the in-line condenser comprises plurality of spaced ducts, and shower means provided above said spaced ducts for sprinkling liquid coolant over the ducts as the waste gases are passed therethrough.

3. Apparatus for purifying industrial waste gases and recovering comparatively pure water as in claim 1 wherein said gas cleaning means is connected to said in line condenser means by a T-shaped duct, one leg of which is pointed downwardly and is open to enable fly ash and other solids in the waste gas flow to be removed therefrom.

4. Apparatus for purifying industrial waste gases and recovering comparatively pure waste as in claim 1 wherein the waste gas circulating means includes a duct connected to the output end of the waste gas purifier and leading to an exhaust fan, the output of which is connected via another duct to said passageway in the vicinity of the input end of the purifier.

5. Apparatus for purifying industrial waste gases and recovering comparatively pure water as in claim 1 wherein the liquid collection means comprises a settling tank connected via piping to the liquid exhaust means of the waste gas purifier, and wherein the liquid from the settling tank is pumped by a pump to the thermal energy generator means.

6. Apparatus for purifying industrial waste gases and recovering comparatively pure water as in claim 1 wherein said condensing box comprises a multi stage arrangement of solid and perforated baffles, along with a network of drain lines located along the lower portion of the condenser box for draining the impurities contained in the superheated steam, and an output nozzle located at the top portion of the condensing box through which comparatively pure water is obtained.

* * * * *